Figure 1:
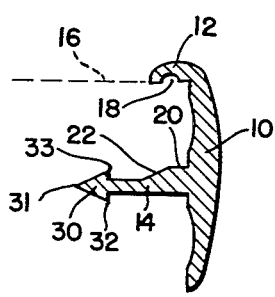

April 12, 1955   G. R. TORRENCE   2,705,820
MOLDING STRIP
Filed May 7, 1951

GEORGE R. TORRENCE
Inventor

By Smith + Tuck
Attorneys

United States Patent Office 2,705,820
Patented Apr. 12, 1955

2,705,820

MOLDING STRIP

George R. Torrence, Seattle, Wash., assignor to Colotrym Company, Seattle, Wash., a corporation of Washington Application May 7, 1951, Serial No. 224,899

4 Claims. (Cl. 20—74)

This invention relates to an improved molding strip and, more particularly, to a molding strip for use in trimming and finishing the edge of a counter or shelf or the like as where quite permanent covering or topping materials are employed upon board surfaces in kitchens, bathrooms, restaurants and similar instances.

In the past molding strips have been used on linoleum or plastic topped wooden surfaces and usually have comprised a flange-edged facing strip that is fastened by screws or nails passing through the strip into the wood to hold the flanged edge in overlapping relation to the topping material. Such installations have not been fully acceptable for the reason that the fastener heads produce a rough broken surface appearance and also do not always hold the flanged edge down tightly to the topping material thereby leaving cracks and crevices in which dirt, soap, grease and moisture may accumulate. A further objection to such installations has been observed in that the amount of time required to place the fasteners has been overly long thus unduly increasing the costs of installation. When moldings have been made in which the fastening devices have been concealed two things have been done. One was the provision of a molding with a rearwardly extending flange that was placed to underlie the topping material as well as the edge flange at the upper surface of the board being topped and trimmed. Often this arrangement, unless the edge of the board was rabbeted to accommodate the thickness of the rear flange, produced an undesirable upsweep of the topping at the counter or table edge and tended to make the top appear dished. Secondly, the molding strips have been provided with channels on the face of the strip in which the fasteners were let into the board edge and then covered by a "feature" strip of plastic or other material inserted in the channel. While the feature strip covered the nail or screw heads it was an added expense, was not always esthetically acceptable, and increased the cracks and crevices in which dirt or moisture could collect. But the primary objection to these prior moldings was that there was no provision of means whereby the molding securely gripped the board edge and topping in such a manner that they were tightly compressed together without gaps and crevices between the molding edge and topping in which accumulations of soil and moisture could be precluded and be fully sanitary.

Having in mind these and other objections of the prior moldings it has been among the more important objects of this invention to provide a molding strip that is simple and easy to install without the use of auxiliary fastening devices; that firmly grips and clamps the molding edge flange to the topping and board without cracks and crevices; that is simple of construction and design to the end that it can be rapidly produced inexpensively in either a rolling or extruding process without extremely complicated tools and dies; and that, once installed, even without auxiliary fastener devices, will stay in place for a long and useful life without loss of the initially obtained desirable tightness, neatness and efficiency.

Figure 4:
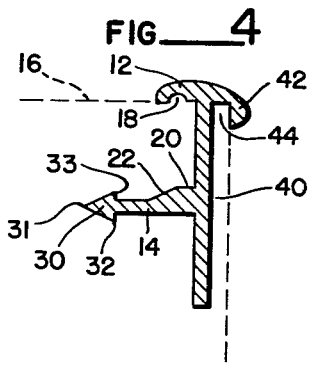
Figure 5:
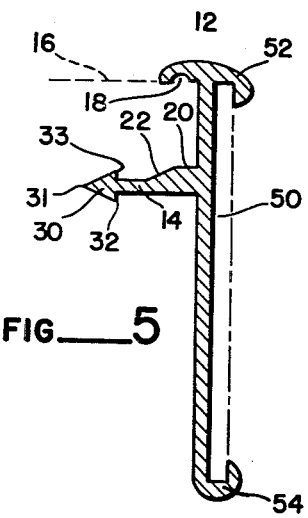
Figure 2:
Figure 3:
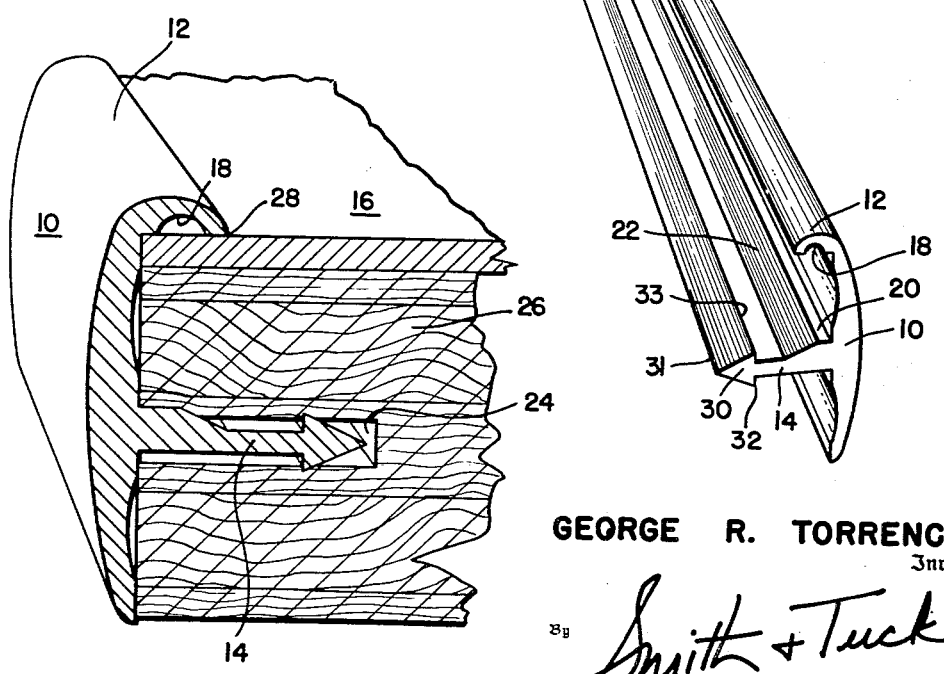

These and other objects of my invention will be fully apparent from the following specification and accompanying drawings in which are shown and described the preferred features of my invention as embodied in several forms of molding strips. In the drawings, wherein like reference numerals designate like parts throughout the same, the several views are:

Figure 1, a cross-sectional view of a preferred form of my molding strip;

Figure 2, a perspective view of the strip of Figure 1;

Figure 3, an enlarged fragmentary perspective view of a molding strip as in Figures 1 and 2 as it appears installed on the edge of board counter or table top with the topping sheet in place; and Figures 4 and 5, cross-sectional views of molding strips embodying the features of the strip of Figure 1 but slightly modified in their exposed faces for variations of installation.

An initial comprehension of my novel molding strip is thought best obtainable by a brief description of its parts in general terminology setting forth the inventive features. A suitable molding strip includes a front wall which, on a table, will be normally mounted upright along the edge of the board material forming the top. Upon the upper edge of such a front wall is formed a flange which turns the corner of the table and its topping, is integral therewith, and bears upon the topping tightly. Outstanding from the rear face of the front wall is an integral ledge or flange, between the upper and lower edges substantially medially, underlying the overhanging edge flange. This ledge is the primary fastening element of the molding strip that holds it to the table edge. At the junction of the upper face of this ledge with the rear face of the upright wall is a wedging fillet which functions, when the molding is installed, to produce gripping pressure between the overhanging edge flange and the ledge upon the table topping and the material forming the edge of the table. In a preferred form of such a molding the rearwardly extending flange is provided with a bead of arrow-head shape and pointed rearward. This bead has tongues which engage in the board of the table top to hold the molding securely in place. Under certain circumstances the overhanging edge flange is relieved by means of a groove to increase its resiliency whereby waviness of the table or topping may be accommodated without there being a separation or crack between the edge flange and the topping.

More specifically, referring to Figures 1, 2 and 3, the molding strip is seen to comprise the three main elements, i. e. the front wall 10, the edge flange 12 and the rearwardly directed ledge 14, all of which parts in the molding shown are integral with each other having been formed by extruding a metallic blank through suitable dies.

Front wall 10 has a convex face which is considered desirable for attractiveness and to insure that with a flat back-face sufficient material is included to provide the required strength. The back face in Figure 1 is shown relieved slightly to reduce weight and to make the front wall slightly resilient.

The edge flange 12 extends from the rear face of wall 10 at an angle slightly less than a right angle and is smoothly and fairly curved from the front face. This flange, in the form of the invention shown installed in Figure 3, bears upon the table topping sheet 16 in a tight manner. It is preferable that the under side of flange 12 be grooved as at 18 to make the flange slightly resilient for reasons to be understood more fully later.

Ledge 14 is likewise an integral flange and extends rearward longitudinally along wall 10 in spaced apart relation beneath flange 12 and approximately along the median of the wall 10. Ledge 14 lies considerably below the under face of edge flange 12 so that a substantial portion of the table edge as well as the table topping can be placed therein.

A fillet 20 is formed between wall 10 and ledge 14 on the upper surface of the ledge and integral with both the ledge and wall. This fillet, which is a strip of metal extending the full length of the molding at the juncture mentioned, has the sloping or inclined face 22 which imparts a wedging action to the fillet under certain circumstances. To understand this it must be borne in mind that in making an installation the craftsman makes a saw cut 24 in the edge of the table 26 along a line approximately at the mid-point in the thickness of the table. With the topping in place the molding strip is installed by inserting the ledge 14 into saw-cut 24 and pressing the molding until the flange 12 is brought in overlying relation along the edge of the topping whereupon final pressure drives the molding home and the inclined or wedging face 22 of fillet 20 presses against and compresses the upper outer edge of saw-cut 24 as shown in Figure 3. This wedging action produces a clamping or gripping action upon the table edge above the saw-cut and upon the topping sheet 16 by pulling the edge flange 12 tightly down onto the topping. Since the preferable form of table, shelf or counter material usually employed is plywood, I have shown that table 24 is of that construction. The several plies are indicated with the saw-cut 24 being made in the core ply. Thus at 26 a portion of the core ply is shown compressed by the wedging fillet 20 when it is pressed home. It should be apparent that the flanged edge 12 is also drawn down upon the upper surface of the topping 16 in a very tight manner. Should there be any waviness along the edges of the table top, flange 12 can flex slightly when the wedging action pulls it down to the topping. This insures that there be no gaps or crevices at joint 28, it being borne in mind that in this case the disposition of flange 12 and wall 10 is now quite close to 90 degrees.

The inner edge of ledge 14 is provided with a bead 30 which is shown as having the shape of an arrow-head and includes the pointed end 31 and outstanding ridges 32 and 33. This arrow-headed bead 30 facilitates the entrance of ledge 14 into groove 24 and the ridges 32, 33 serve as retainers to hold the ledge in place since the ridge-to-ridge distance is by pre-arrangement greater than the thickness of the saw-cut or groove 24. The ridges 32, 33 tend to bite into the wood at the faces of the saw-cut and prevent outward displacement of the ledge from the groove.

It will be noted that the design of the molding of Figure 1 is such that the distance from the free or inward edge of flange 12 to the upper edge of ridge 33 is greater than the distance from the edge of flange 12 to the wedging surface 22. By this arrangement it is possible to insert the arrow-headed bead 30 into a saw-cut 24 and at the same time tilt the molding sufficiently so that when the bead 30 has penetrated the saw-cut the free edge of flange 12 can be easily engaged over the topping and the latter brought into contact with the wall 10 without the wedging action having been fully had. The operator thereupon can continue the application of pressure on the molding in line with the direction of the saw-cut, and in that region, to press the ledge home whereupon he obtains the wedging effect of the fillet 20 and its inclined surface. In this latter event a full and final gripping pressure is obtained on the topping and that portion of the wood between flange 12 and ledge 14 which secures the topping down, draws the molding edge tightly to the topping, and sears the molding tightly in the saw-cut 24, the clamping being had at the three points 33, 20 and 12. In its inward movement the arrow-shaped bead 30 penetrates the saw-cut easily but when it comes to rest the wood behind ridges 32, 33 tends to swell and to act to prevent the withdrawal of the bead and its ridges.

The molding that has been described, it will be seen, is easy to apply, provides the desirable non-drip edge to contain on the upper surface of a table incidental water that may be spilled or splashed thereon, requires no screws or nails to hold it in place, and in general provides waterproofness and fully sanitary trimming of a table or counter edge.

In Figures 4 and 5 are shown molding strips 40 and 50 respectively which include all of the elements thus far described but, in addition, have other features of note. Molding 40 includes a forwardly directed flange 42 undercut at 44 to form a groove so that the molding may be placed at an outside corner and accommodate topping materials meeting at right angles to each other. Molding 50 in addition to including the undercut flange 52 has a second opposed flange 54 at the other edge of the front wall. Between these flanges a piece of topping material may be slid as an insert to provide an apparently wide-edge appearance to a table top and to reduce the amount of metal showing in respect to the topping material. Each of the moldings 40 and 50 is secured in place in just the manner that has been described.

It should be apparent to those skilled in the art that changes and modifications may be made in these constructions. Such as come fairly within the spirit and scope of the subjoined claims are deemed to be covered.

Having thus described my invention, I claim:

1. A trim molding for the edge of a counter, shelf or the like, comprising: an upright wall having an integral ledge outstanding along its rear face intermediate its upper and lower edges, and insertable in a kerf formed in the edge of the member being trimmed, said ledge having a wedging fillet substantially at the juncture of said wall with the upper side of the ledge, said fillet including an inclined surface rearwardly and downwardly directed and merging at its lower end with the upper face of the ledge at an obtuse angle, the underside of said ledge being flat and merging with said wall at substantially a right angle, and a marginal flange integral and rigid with said wall at its upper edge and overhanging said wedging fillet, said ledge being provided with means for retaining said ledge within said kerf.

2. The structure according to claim 1 in which said overhanging marginal flange has a longitudinally extending groove disposed between flat bearing surfaces on its underside, by which means the flange is resilient, and said flange flat bearing surfaces are inclined to the horizontal and tend to converge with the plane of said ledge as they extend from said upright wall.

3. The structure according to claim 1 in which said ledge is retained within said kerf by providing said ledge with a bead at its free edge, said bead having a cross-section of a rearwardly pointed arrow-head, the distance from the free edge of said flange to the upper edge of said bead being greater than the distance from the free edge of said flange to the said inclined surface to enable said molding to be tilted with said bead inserted within said kerf so that the free edge of said flange can be easily engaged over the top of the member being trimmed.

4. The combination with a counter having an exposed forward nosing edge of a trim molding covering said edge, comprising: said counter having a horizontal kerf extending along the intermediate portion of said edge, said molding having an upright wall covering said edge and having an integral ledge outstanding along the rear face of said wall intermediate its upper and lower edges positioned in said kerf and having a marginal rearwardly-extending flange integral with said wall at its upper edge and positioned on the upper marginal surface of said counter, the under side of said ledge being flat and merging with said wall at a right angle and the upper side of said ledge having a wedging fillet substantially at its juncture with said wall under said marginal flange including an inclined surface rearwardly and downwardly directed and merging at its lower end with the upper face of said ledge at an obtuse angle, the distance between the under side of said marginal flange and the uppermost portion of said fillet being less than the distance between the upper surface of said counter and the top of said kerf prior to the installation of the molding, and said fillet being wedged into said kerf compressing and distorting the abutting upper kerf wall and drawing said marginal flange down tightly on the upper surface of said counter, and said ledge having barb means rearward of said fillet engaging the upper and lower walls of said kerf in a direction preventing withdrawal of the ledge from the kerf.

References Cited in the file of this patent

UNITED STATES PATENTS 2,549,414    Bonnell _____ Apr. 17, 1951

FOREIGN PATENTS 202,814    Switzerland _____ 1939

OTHER REFERENCES

Catalog No. 140, B & T Floor Company, 1940, Designs, item 44, page 8.